United States Patent
Ahmed et al.

(10) Patent No.: US 10,083,216 B2
(45) Date of Patent: Sep. 25, 2018

(54) IDLING INDIVIDUALLY SPECIFIED OBJECTS DURING DATA REPLICATION

(71) Applicant: International Business Machines Corporation, Armonk, NY (US)

(72) Inventors: Mohamed M. Ahmed, Oakville (CA); Laura A. Cuell, Coquitlam (CA); Phillip R. Koza, San Jose, CA (US); Victor L. Szabo, Stouffville (CA)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 14/707,707

(22) Filed: May 8, 2015

(65) Prior Publication Data

US 2016/0328460 A1    Nov. 10, 2016

(51) Int. Cl.
    *G06F 17/30*    (2006.01)
(52) U.S. Cl.
    CPC .. *G06F 17/30575* (2013.01); *G06F 17/30578* (2013.01); *G06F 17/30212* (2013.01); *G06F 17/30368* (2013.01)
(58) Field of Classification Search
    CPC ......... G06F 17/30575; G06F 17/30578; G06F 17/30212; G06F 17/30368
    See application file for complete search history.

(56) References Cited

U.S. PATENT DOCUMENTS

| 5,884,327 | A  | * | 3/1999 | Cotner | G06F 17/30377 |
| 7,739,235 | B2 |   | 6/2010 | Rousseau et al. | |
| 7,979,546 | B2 |   | 7/2011 | Hamel et al. | |
| 8,706,994 | B2 |   | 4/2014 | Akirav et al. | |
| 8,751,443 | B1 |   | 6/2014 | McCline et al. | |
| 2004/0133591 | A1 | * | 7/2004 | Holenstein | G06F 11/2064 |
| 2005/0049945 | A1 | * | 3/2005 | Bourbonnais | G06F 17/30575 705/30 |
| 2005/0193039 | A1 | * | 9/2005 | Adiba | G06F 17/30312 |
| 2006/0190503 | A1 | * | 8/2006 | Naicken | G06F 17/30575 |

(Continued)

OTHER PUBLICATIONS

K. Syed, "SQL Server Replication Step by Step", Jan. 27, 2014, retrieved Sep. 27, 2017 from https://www.codeproject.com/Articles/715550/SQL-Server-Replication-Step-by-Step.*

(Continued)

*Primary Examiner* — Apu Mofiz
*Assistant Examiner* — Sheryl Holland
(74) *Attorney, Agent, or Firm* — Susan Murray; SVL IPLaw

(57) ABSTRACT

According to one embodiment of the present invention, during database replication from a source database to a target database, operations applied to the source database are transferred as target operations and applied to the target database. A request from a requestor to idle a specified database object is received during the database replication. In response to receiving the request, transference of the target operations for the specified database object from the source database to the target database is terminated and target operations for the specified database object on the target database are monitored. In response to no target operations being applied to the specified database object on the target database, replication of the specified database object is suspended and the requestor is notified when the idling of the specified database object has completed.

12 Claims, 5 Drawing Sheets

(56) References Cited

U.S. PATENT DOCUMENTS

| | | | |
|---|---|---|---|
| 2008/0005183 A1* | 1/2008 | Bostick | G06F 17/30306 |
| 2008/0189340 A1 | 8/2008 | Blea et al. | |
| 2009/0313311 A1* | 12/2009 | Hoffmann | G06F 11/2094 |
| 2012/0023066 A1* | 1/2012 | Bourbonnais | G06F 17/30566 |
| | | | 707/613 |
| 2013/0067017 A1* | 3/2013 | Carriere | G06Q 10/06 |
| | | | 709/208 |
| 2013/0159249 A1* | 6/2013 | Dewall | G06F 11/1662 |
| | | | 707/610 |
| 2014/0156598 A1 | 6/2014 | Chandra et al. | |
| 2015/0088823 A1* | 3/2015 | Chen | G06F 17/30578 |
| | | | 707/626 |
| 2016/0179918 A1* | 6/2016 | Martin | G06F 17/30578 |
| | | | 707/607 |

OTHER PUBLICATIONS

G. Sakuth, "IBM InfoSphere Data Replication Performance—Tuning CDC LUW for Mere Mortals", 2014, IBM Information Management.*

Coulon, C., Pacitti, E. & Valduriez, P, "Consistency Management for Partial Replication in a High Performance Database Cluster", Proceedings on 11th International Parallel and Distributed Systems, 2005, 1, pp. 809-815.

IBM (Jun. 2003). "Initial Full Refresh for a Push Apply". IBM TDB. IPCOM000013782D.

IBM, "Smarter Business: Dynamic Information with IBM InfoSphere Data Replication CDC", Version 6.5 of IBM InfoSphere Change Data Capture, Mar. 2012.

List of IBM Patents or Patent Applications Treated as Related, May 5, 2016, 1 pages.

* cited by examiner

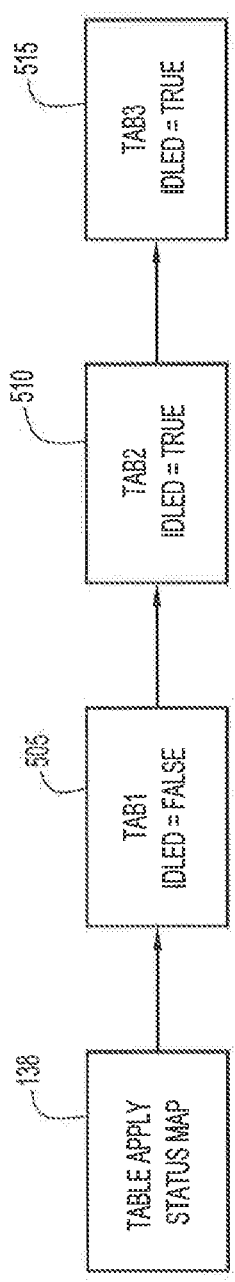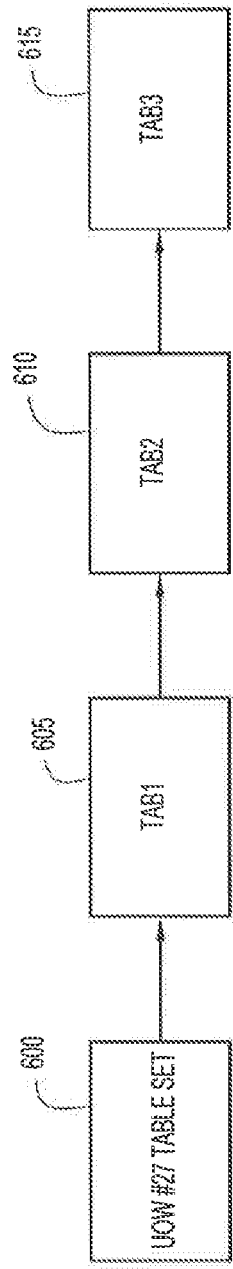

IDLING INDIVIDUALLY SPECIFIED OBJECTS DURING DATA REPLICATION

BACKGROUND

1. Technical Field

Present invention embodiments relate to database replication systems, and more specifically, to idling replication of a specified database object during database replication.

2. Discussion of the Related Art

Data replication services store data from a source database in databases of separate query machines thereby providing the ability to run queries with up to date information but without burdening the source database.

When a data replication service experiences high latency, the information on the separate query machine may only be current as of the latency period. For instance, if latency is one hour, results of a query would only have information from an hour ago. If only a particular table or a particular set of tables need to be queried, it might be faster to load data directly from the table in the source database into the particular table or the particular set of tables on the separate query machine so that the query can be run on the separate query machine with up to date data.

With replication for a particular table on the separate query machine active, however, the particular table cannot be loaded on the separate query machine until replication operations on the particular table are completed and/or stopped, i.e., until replication of the particular table is idled. Otherwise, errors will occur. In order to idle replication of the particular table, the entire replication needs to stop for all tables of the replicated database, thereby requiring a restart of the entire replication process.

SUMMARY

According to one embodiment of the present invention, during database replication from a source database to a target database, operations applied to the source database are transferred as target operations and applied to the target database. A request from a requestor to idle a specified database object is received during the database replication. In response to receiving the request, transference of the target operations for the specified database object from the source database to the target database is terminated and target operations for the specified database object on the target database are monitored. In response to no target operations being applied to the specified database object on the target database, replication of the specified database object is suspended and the requestor is notified when the idling of the specified database object has completed.

BRIEF DESCRIPTION OF THE DRAWINGS

FIG. 5 is a diagrammatic illustration of a table apply status map according to an embodiment of the present invention.

FIG. 6 is a diagrammatic illustration of a "Unit of Work" table set according to an embodiment of the present invention.

DETAILED DESCRIPTION

Present invention embodiments provide methods and systems to idle replication of a database object specified by a user or by a database application during ongoing database replication by a replication system. While the idling operations are operations separate from the replication operations, they are tied in with the operations of the replication system to guarantee that the database object is idled as quickly as possible and to guarantee that the user or the database application that initiates the idling request is notified promptly about success or failure of the idling operations.

In an example embodiment, the replication system is implemented as a Change Data Capture (CDC) log-based replication system which includes a source server system with a source database and a target server system with a target database. Tables of the source database are replicated to corresponding tables of the target database.

During ongoing replication, a specified table or a set of specified tables of the target database is requested to be idled. Several operations are performed in the source server system and in the target server system to idle the specified table or the set of specified tables. Messages are exchanged between the source server system and the target server system in accordance with an idling protocol. When the idling of the specified table or the set of specified tables is completed, a notification is sent to the user or the application that initiated the idling request indicating whether the idling of the specified table or the set of specified tables was successful.

When the specified table or the set of specified tables is idled, any replication from the source database of the specified table or of each table of the set of specified tables is suspended or paused. In response to no target operations currently being applied to the specified table or the set of specified tables on the target database, the specified table or the set of specified tables is immediately idled. Otherwise, idling must wait until all in-flight operations are applied. Once the specified table or the set of specified tables is idled, new operations on these tables can be performed without suspending replication of other tables to the target database and without generating errors in the replication system.

Figure 1:
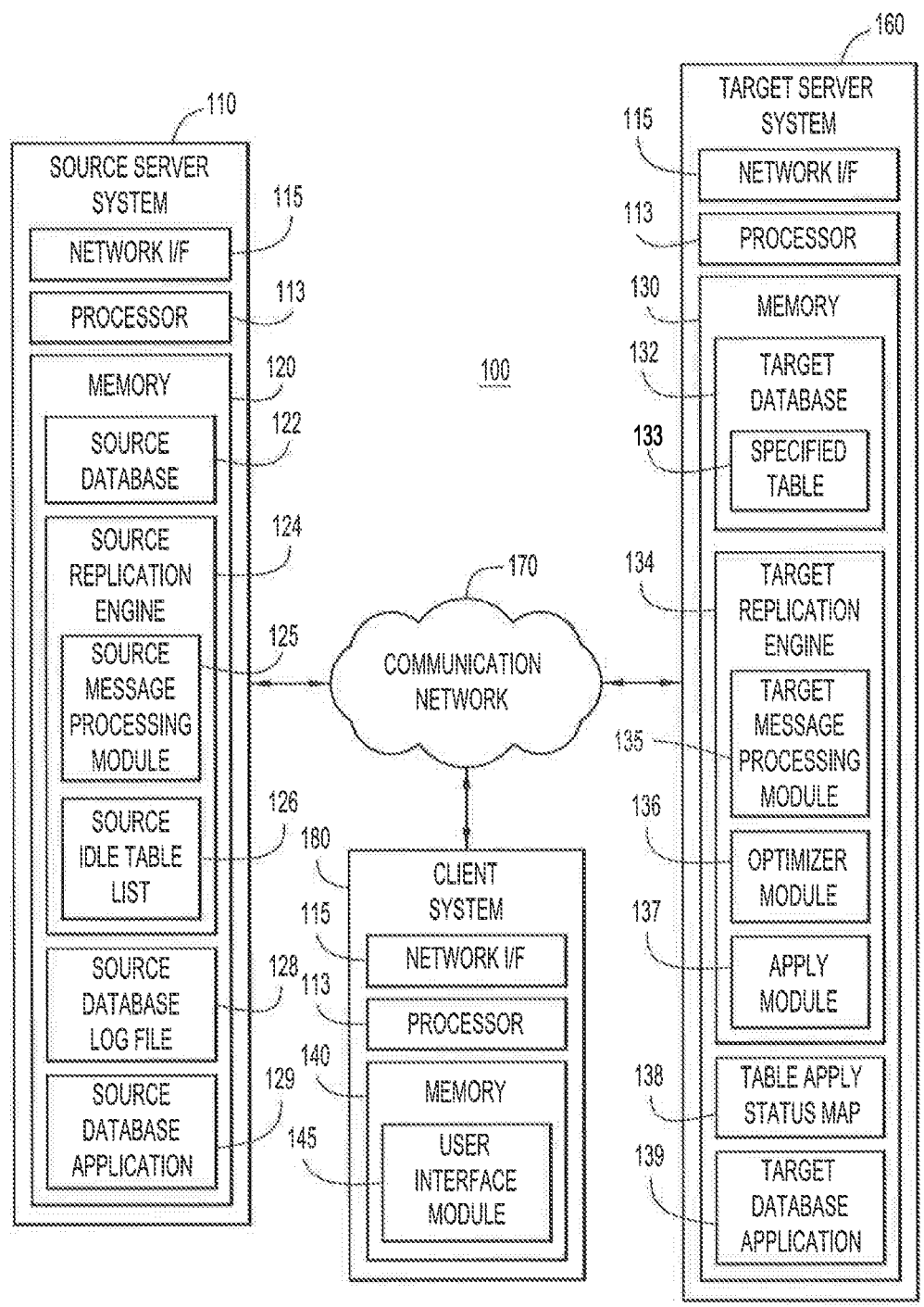
FIG. 1 is a diagrammatic illustration of an example computing environment for use with an embodiment of the present invention.

An example environment for use with present invention embodiments is illustrated in FIG. 1. Specifically, the environment includes source server system 110, target server system 160 and client system 180. Source server system 110, target server system 160 and client server system 180 may be remote from each other and communicate over communication network 170. Source server system 110, target server system 160 and client system 180 include network interfaces 115 which enable source server system 110, target server system 160 and client system 180 to communicate via communication network 170. Communication network 170 may be implemented by any number of any suitable communications media (e.g., wide area network (WAN), local area network (LAN), Internet, Intranet, etc.). Alternatively, source server system 110, target server system 160 and client system 180 may be local to each other, and communicate via any appropriate local communication medium (e.g., local area network (LAN), hardwire, wireless link, Intranet, etc.).

In an example embodiment, the protocol used for communication between the source server system 110, the target server system 160 and the client system 180 may be the Transmission Control Protocol/Internet Protocol (TCP/IP).

Processors 113 of source server system 110, target server system 160 and client system 180 execute source replication engine 124, target replication engine 134 and user interface module 145, respectively. Source replication engine 124 and target replication engine 134 form a replication system for source database 122 and target database 132.

Source server system 110 maintains source database log file 128. Source server system 110 may have many independent connections to other database systems or client systems (not shown), making concurrent changes to the data in source database 122. Changes to source database 122 are represented by transactions. Each connection may have open transactions containing all the changes that have been made on that connection since it last committed or rolled back. Other connections may also include committed transactions. All these uncommitted and/or committed changes are written to source database log file 128. Certain transactions logged in source database log file 128 relate to the connection between source database 122 and target database 132.

During replication, source replication engine 124 reads log records from source database log file 128, determines the operation that corresponds to each log record, determines if the operation is in-scope for replication, and sends a message that describes each operation to target replication engine 134. Target message processing module 135 receives the messages from source replication engine 124 and puts them in a pipeline of threads that process these messages and then applies the corresponding operation (typically insert, update, or delete SQL operations) to target database 132. To maintain transaction consistency, the target operations are committed on the source transaction boundaries, although these transactions may be grouped together to reduce the number of commits that are done.

When target replication engine 134 receives replication messages, target replication engine 134 may batch the operations into a "Unit of Work" (UOW) to increase throughput. Multiple UOWs may be handled in parallel by target server system 160.

Batch operations are performed by optimizer module 136 of target replication engine 134 which may be enabled or disabled depending on a configuration of target replication engine 134. When optimizer module 136 is disabled, operations are applied serially in the original order received by the apply module 137.

When optimizer module 136 is enabled and replication messages are received by target replication engine 134, optimizer module 136 optimizes the replication process. For example, optimizer module 136 reorders operations by table to increase batching opportunities or separates operations into sets to be sent to separate apply modules 137 to increase apply concurrency.

When a UOW is considered to be "full," the UOW is submitted by optimizer module 136 to be applied by the apply module 137. This usually occurs on a source commit boundary, in which case, all operations in a UOW are applied and committed, and thereafter, optimizer module 136 is free to submit another UOW to be applied. If any errors occur during the processing of the UOW, any already applied operations are rolled back and the operations are resubmitted and applied serially in the original order.

In some cases, during replication, the operations of the UOW can be applied before the UOW is "full" and not on a commit boundary. This can occur if memory resources become low. In this case the operations are applied, but not committed. Only when a UOW is submitted on a commit boundary will the operations be committed. If the UOW "full" threshold is large then the time between UOW commits can be large and the amount of time to apply and commit a UOW can also be substantial. In this situation it can be challenging to promptly idle a specified table if the replication system must wait for all operations to be applied and committed.

Source database 122 and target database 132 may be implemented by any conventional or other database or storage unit, may be local to or remote from source server system 110 and target server system 160, respectively, and may communicate via any appropriate communication medium (e.g., local area network (LAN), wide area network (WAN), Internet, hardwire, wireless link, Intranet, etc.).

Source server system 110, target server system 160 and client system 180 may present a graphical user (e.g., User Interface module 145, etc.) or other interface (e.g., command line prompts, menu screens, etc.) to solicit information from users and may provide notifications to the users.

Source server system 110, target server system 160 and client system 180 may be implemented by any conventional or other computer systems preferably equipped with a display or monitor, a base (e.g., including at least one processor 113, one or more memories 120, 130 and 140 and/or internal or external network interfaces or communications devices 115 (e.g., modem, network cards, etc.)), optional input devices (e.g., a keyboard, mouse or other input device), and any commercially available and custom software (e.g., server/communications software, source and target database application software, source and target message processing module, optimizer module, etc.).

The graphical user (e.g., user interface module 145, etc.) or other interface (e.g., command line prompts (not shown), menu screens (not shown), etc.) solicits information from a corresponding user pertaining to the tables to be idled and provides notifications to the users.

In an example embodiment, a table of target database 132 is specified by a user through user interface module 145. Specified table 133 in target database 132 is requested to be idled by sending a request to either source server system 110 or target server system 160. A mechanism is provided to notify the user and/or the application once the idle operation has completed.

Specified table 133 of target database 132 may also be requested to be idled by either applications 129 and 139, or by any other application (not shown). There are many reasons why a user or a database application, such as applications 129 and/or 139 may request specified table 133 of target database 132 to be idled. Specified table 133 of target database 132 may no longer be in sync with the corresponding source table of source database 122 because modifications were done directly to target database 132 and not through the replication system. The replication system may experience a high latency so that the information in the target table is not current. A large batch job may have occurred on specified table 133 using a bulk load utility outside the replication system which also may result in specified table 133 of target database 132 being no longer in sync with the corresponding source table of source database 122. Another reason why a user may request specified table 133 to be idled may be that the user needs to make structural data definition language (DDL) changes to specified table 133 or the corresponding source table. Before any of these operations can be applied to specified table 133, the replication system needs to stop modifying specified table 133.

This involves completing and/or suspending any transaction that sends data related to specified table 133 from source database 122 to target database 132. It also involves completing and/or suspending any operation applied to specified table 133 at the target server system 160.

The various modules and applications (e.g., source and target message processing modules 125 and 135, optimizer module 136, user interface module 145, source and target database applications 129 and 139, etc.) may be implemented by any combination of any quantity of software and/or hardware modules or units, and may reside within memories 120, 130 and 140 of source server system 110, target server system 160 and/or client system 180 for execution by processors 113.

User interface 145 may be connected to either source server system 110 or target server system 160 or both via communication network 170.

In the example embodiment shown in FIG. 1, memory 120 of source server system 110 stores source database 122, source replication engine 124, which includes source message processing module 125, source idle table list 126, source database log file 128, and source database application 129. Memory 130 of target server system 160 stores target database 132 which includes specified table 133, target replication engine 134, which includes target message processing module 135 and optimizer module 136, table apply status map 138, and target database application 139.

Figure 2:
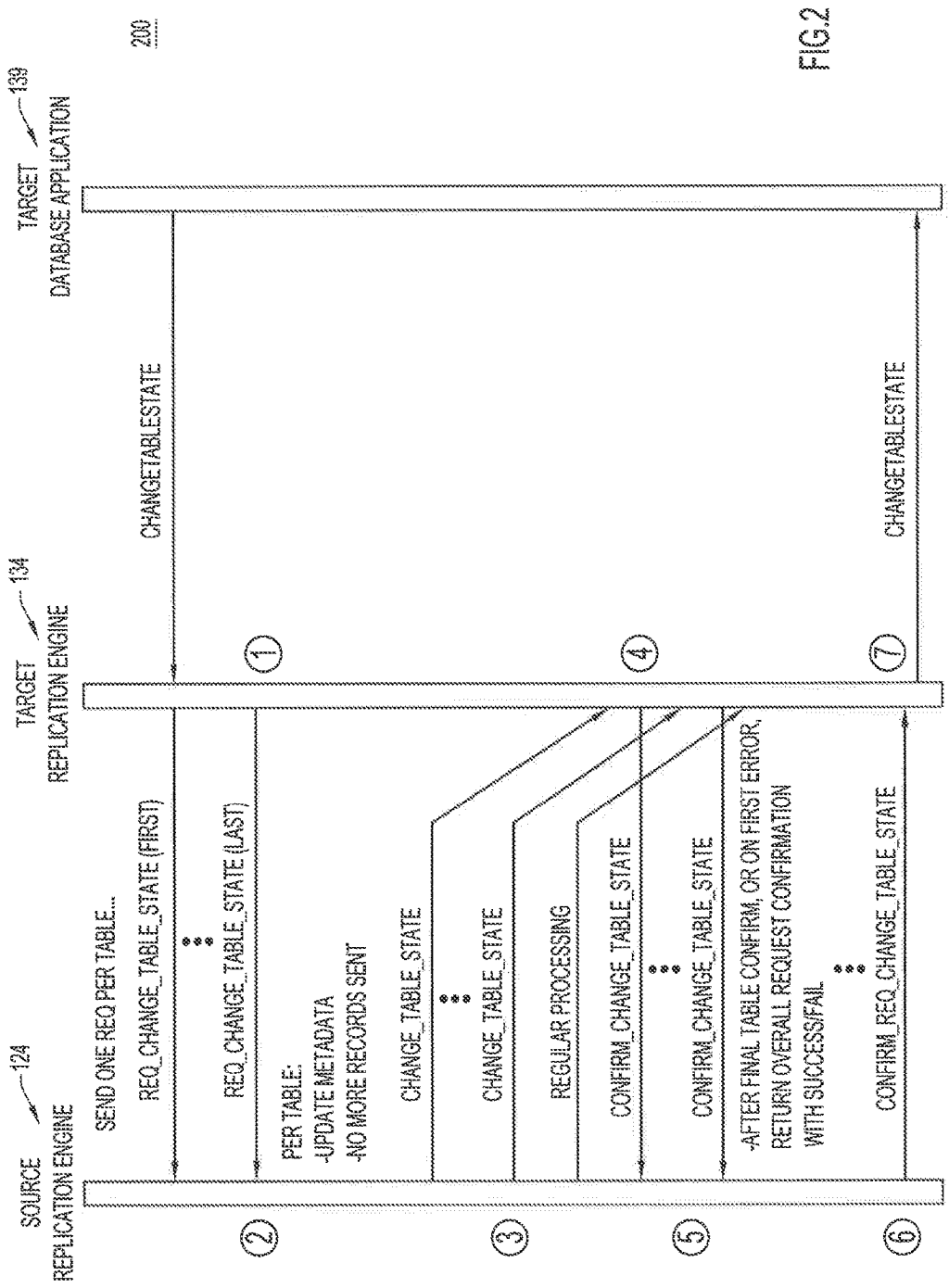
FIG. 2 is a diagrammatic illustration of the idling protocol according to an embodiment of the present invention.

The operations to idle specified table 133 or a set of specified tables of target database 132 are performed according to an idling protocol. A diagrammatic illustration of the idling protocol 200 according to an example embodiment of the present invention is shown in FIG. 2. Idling protocol 200 is managed by source replication engine 124.

In the example embodiment illustrated in FIG. 2, a request to idle specified table 133 or a set of specified tables, i.e., to suspend or pause replication to specified table 133 or to the set of specified tables, is initiated by target database application 139. As discussed with regard to FIG. 1, the request can also be initiated by a user through user interface module 145, by source database application 129, or by any other application (not shown) executed on source server system 110, target server system 160, or client system 180. The request is received by target replication engine 134 at processing stage 1 when target replication engine 134 receives a ChangeTableState message from target database application 139 that includes information identifying specified table 133 or the set of specified tables of target database 132 to be idled.

When target replication engine 134 receives the ChangeTableState message at processing stage 1, target message processing module 135 of target replication engine 134 sends a REQ_CHANGE_TABLE_STATE message for specified table 133 or several REQ_CHANGE_TABLE_STATE messages for each table of the set of specified tables to source replication engine 124.

In accordance with another example embodiment, instead of sending multiple REQ_CHANGE_TABLE_STATE messages for each specified table of the set of tables, at processing stage 1, target message processing module 135 of target replication engine 134 may also send a single REQ_CHANGE_TABLE_STATE message to source replication engine 124 that includes a list of all specified tables of the set of specified tables of target database 132 to be idled.

Figure 3:
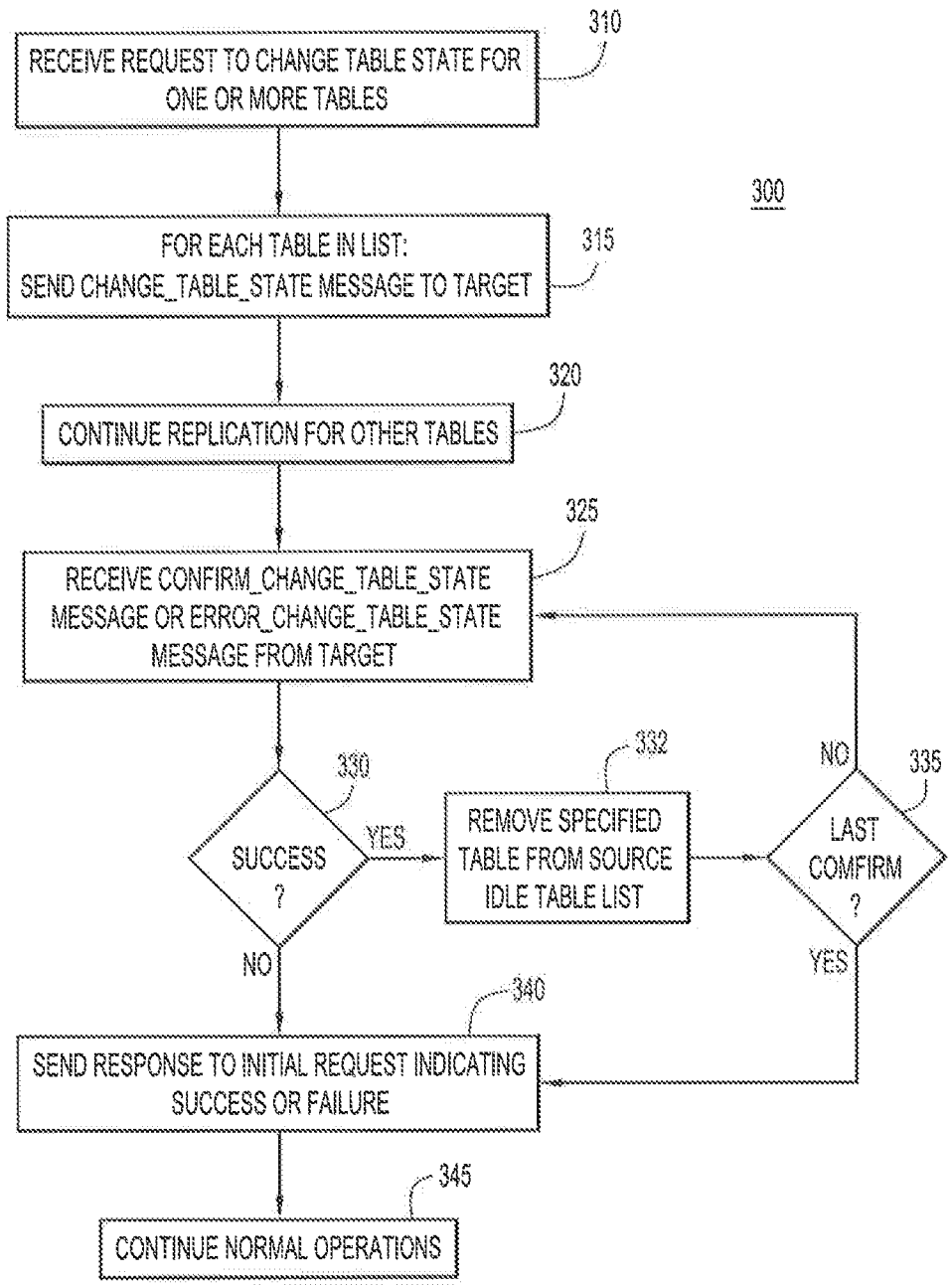
FIG. 3 is a procedural flow chart illustrating a manner in which a source replication engine manages an idling protocol according to an embodiment of the present invention.

At processing stage 2, source replication engine 124 receives the REQ_CHANGE_TABLE_STATE message, or the REQ_CHANGE_TABLE_STATE messages, sent by target replication engine 134 and performs several operations discussed in further detail with regard to FIG. 3. Operations of source replication engine 124 at processing stage 2 include but are not limited to recording information about specified table 133 or about the specified tables of the set of tables in source idle table list 126. After information about specified table 133 (or about the specified tables of the set of tables) is stored in source idle table list 126, replication to specified table 133 is stopped and no more data is sent to target server system 160 for the specified table.

At processing stage 3, source replication engine 124 sends CHANGE_TABLE_STATE messages for each specified table to be idled back to target replication engine 134. In addition, source replication engine 124 continues with regular replication processing of all other tables of source database 122 that correspond to tables of target database 132 and/or that correspond to other databases connected to source server system 110 (not shown) and that are not requested to be idled.

Similar to the REQ_CHANGE_TABLE_STATE messages processed at processing stages 1 and 2, CHANGE_TABLE_STATE messages may be sent for each individually specified table 133 of target database 132 to be idled or a single CHANGE_TABLE_STATE message may be sent to target replication engine 134 that includes a list of specified tables of target database 132 requested to be idled.

At processing stage 4, target replication engine 134 receives the CHANGE_TABLE_STATE message or multiple CHANGE_TABLE_STATE messages for each specified table from source replication engine 124. In addition, target replication engine 134 receives regular replication processing requests from source replication engine 124 for tables of target database 132 that are not requested to be idled.

Figure 4:
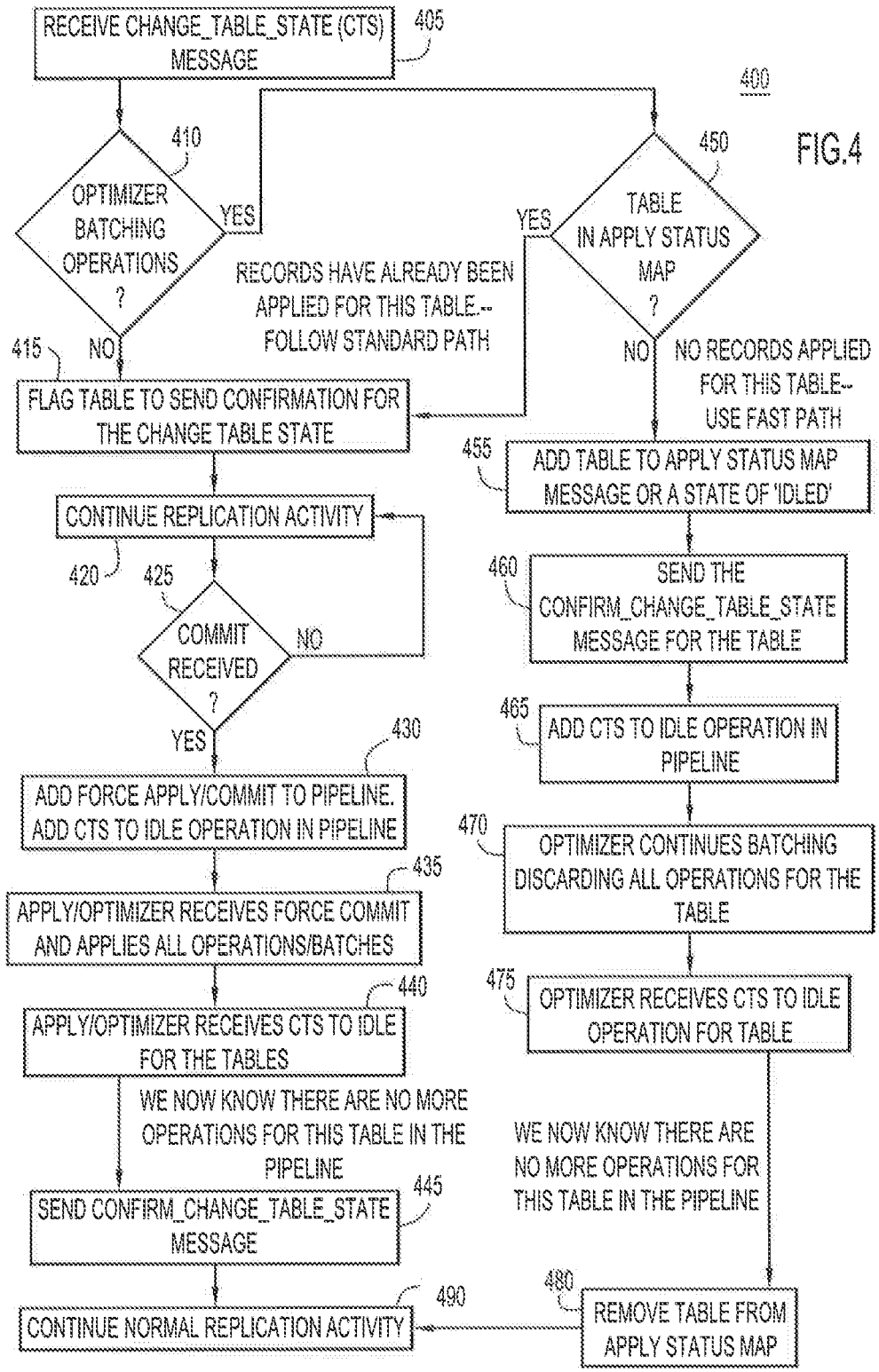
FIG. 4 is a procedural flow chart illustrating a manner in which a target replication engine manages the idling protocol according to an embodiment of the present invention.

Several operations are performed by target replication engine 134 that are described in further detail with regard to FIG. 4. Operations of target replication engine 134 at processing stage 4 include but are not limited to operations to suspend replication to specified table 133 or of all specified tables of a set of tables at target server system 160 and operations to continue replication to tables of target database 132 that are not requested to be idled. At processing stage 4, when target replication engine 134 completes operations to idle a specified table, for each specified table successfully idled, i.e., for which replication operations are successfully suspended or paused, target message processing module 135 sends a CONFIRM_CHANGE_TABLE_STATE message to source replication engine 124.

At processing stage 5, source replication engine 124 receives the CONFIRM_CHANGE_TABLE_STATE messages and sends target replication engine 134 a CONFIRM_REQ_CHANGE_TABLE_STATE message to confirm that the idling operation was successful. At processing stage 7, target replication engine 134 notifies target database application 139 that all specified tables have been successfully idled by sending a ChangeTableState message to database application 139.

Although not shown in FIG. 2, at processing stage 4, target replication engine 134 may also send an ERROR_CHANGE_TABLE_STATE message to source replication engine 124 indicating that an error occurred during the idling operation for a specified table of target database 132. Upon receiving of the ERROR_CHANGE_TABLE_STATE message, source replication engine 124 sends an ERROR_REQ_CHANGE_TABLE_STATE message (not shown) to target replication engine 134 indicating that the idling operation was not successful which is received by target replication engine 134 at processing stage 7. When target replication engine 134 receives an ERROR_REQ_CHANGE_TABLE_STATE message (not shown) at processing stage 7, target replication engine 134 notifies target database application 139 with a ChangeTableState message that the idling operations were not successful.

A manner in which source replication engine 124 manages the idling protocol according to an embodiment of the present invention is illustrated in FIG. 3 with reference to FIG. 2. FIG. 3 illustrates portions of the idling protocol performed by source replication engine 124 at processing stages 2, 3, 5 and 6 of FIG. 2.

Initially, at processing stage 1, a request to idle a specified table or a set of specified tables is issued to target replication engine 134 from database applications 129, 139, or from user interface module 145. At step 310 in FIG. 3, which is executed at processing stage 2 shown in FIG. 2, source message processing module 125 of source replication engine 124 receives a REQ_CHANGE_TABLE_STATE message from target message processing module 135 of target replication engine 134 forwarding a request to change table state for one or more specified tables of target database 132. The request to change table state may include a plurality of messages (such as REQ_CHANGE_TABLE_STATE messages shown in FIG. 2), or a single REQ_CHANGE_TABLE_STATE message that includes a list of specified tables to be idled. When source replication engine 124 receives the request to change the table state, source replication engine 124 records the one or more specified tables of the target database to be idled in source idle table list 126, and stops sending operations for the one or more specified tables to target replication engine 134.

At step 315, message processing module 125 sends CHANGE_TABLE_STATE messages, such as the CHANGE_TABLE_STATE messages shown in FIG. 2, for each of the one or more specified tables of target database 132 to be idled to target replication engine 134. After sending the CHANGE_TABLE_STATE messages, at step 320, source replication engine 124 continues replication of all other tables of source database 122 that are not to be idled.

As discussed above, the operations of the CDC log-based replication system include reading source database log file 128, determining the operation that correspond to each log record and sending messages that describe each operation to target replication engine 134. However, when any of these operations from source database log file 128 involve operations for a table, such as specified table 133 of target database 132 that is requested to be idled, the operations from source database log file 128 relating to specified table 133 are disregarded by source replication engine 124 and not sent to target replication engine 134.

At step 325, source replication engine 124 receives a CONFIRM_CHANGE_TABLE_STATE message from target replication engine 134. The CONFIRM_CHANGE_TABLE_STATE message confirms that the state of the specified table 133 (or any other table of a set of tables requested to be idled) has been changed by target replication engine 134 to idle. Idling operations performed by target replication engine 134 at processing stage 4 in FIG. 2 are discussed in greater detail below with regard to FIG. 4.

When source replication engine 124 receives a CONFIRM_CHANGE_TABLE_STATE message for a specified table of a set of specified tables to be idled, at step 330, source replication engine 124 determines that the particular specified table included in the message was successfully idled and at step 332 removes the particular specified table from source idle table list 126. Thereafter, source replication engine 124 continues to step 335 at which it determines if the particular specified table was the last table of the set of specified tables to be idled. If source replication engine 124 determines that the particular specified table was not the last table of the set of specified tables to be idled, source replication engine 124 proceeds to step 325 for the next table. Otherwise, source replication engine 124 proceeds to step 340 at which it sends a CONFIRM_REQ_CHANGE_TABLE_STATE message to target replication engine 134 indicating that all specified tables included in the idling request received in step 310 have been successfully idled. Thereafter, source replication engine 124 proceeds to step 345 at which the replication system continues with normal replication operations, i.e., with operations that do not involve idling of tables of target database 132.

Source replication engine 124 may also receive an ERROR_CHANGE_TABLE_STATE message at step 325 from target replication engine 134. When source replication engine 124 receives the first ERROR_CHANGE_TABLE_STATE message, at step 330 it determines that the entire idling operation for all tables specified in the request received at step 310 has failed. Source replication engine 124 proceeds to step 340 at which it sends an ERROR_REQ_CHANGE_TABLE_STATE message to target replication engine 134 indicating that the entire idling operation for all tables specified in the request received at step 310 has failed. Thereafter, source replication engine proceeds to step 345 at which the replication system continues with normal replication operations, i.e., with operations that do not involve idling of tables of target database 132.

A manner in which target replication engine 134 manages the idling protocol according to an embodiment of the present invention is illustrated in FIG. 4. Steps performed by the target replication engine 134 illustrated in FIG. 4 correspond to processing stages 4 and 7 shown in FIG. 2.

Target replication engine 134 includes optimizer module 136 which can be configured to be turned on or off. When optimizer module is not running, operations are performed sequentially in the order received. When optimizer module 136 is running, optimizer module 136 batches operations of a transaction into units of work, i.e., optimizer module 136 reorders the operations received in transactions by table to increase batching opportunities or separates the operations into sets to be sent to separate apply modules (not shown) of target replication engine 134 to increase apply concurrency. In addition to these replication tasks, optimizer module 136 performs tasks of the idling protocol shown in FIG. 2.

Initially, at step 405, which is executed at processing stage 4 in FIG. 2, target replication engine 134 receives a CHANGE_TABLE_STATE message from source message processing module 125 of source replication engine 124. The CHANGE_TABLE_STATE message may include, e.g., specified table 133. Target replication engine 134 determines in step 410 whether optimizer batching operations are performed, i.e., whether optimizer module 136 is running.

When it is determined at step 410 that optimizer module 136 is running, target replication engine 134 proceeds to step 450 at which optimizer module 136 determines whether specified table 133 (or a particular table of a set of specified tables included in the CHANGE_TABLE_STATE message received at step 405) is contained in table apply status map 138.

Generally, when the optimizer module 136 is running, when operations for one or more tables of target database 132, such as insert, update, delete or commit, are forwarded to the apply module 137 each table for which target replication engine 134 received operations in the transaction is stored in table apply status map 138. Thereby, table apply status map 138 keeps track of each table for which apply module 137 received operations to be applied.

When it is determined at step 450 that specified table 133 is already included in table apply status map 138, target replication engine 134 determines that some data has already been applied to specified table 133 as part of the replication process. Target replication engine 134 proceeds to step 415 at which specified table 133 is flagged to send confirmation for change table state to source replication engine 124 once the idling operations are completed.

If it is determined at step 410 that the optimizer module 136 is not running, target replication engine 134 proceeds to step 415.

Since specified table 133 cannot be idled until already applied operations are committed, at step 420, replication of tables is continued to be performed until at step 425 a commit is received. At step 430, the target replication engine 134 inserts a control record to force commit and inserts a control record to idle specified table 133 to the pipeline. At step 435, optimizer module 136 or apply module 137 receives the 'force commit' and apply module 137 completes the current UOW and issues a commit to the target database 132. At step 440, optimizer module 136 or apply module 137 receives a control message to idle specified table 133 from target replication engine 134 indicating that there are no more operations for specified table 133 in the replication pipeline and at step 445 target message processing module 135 of target replication engine 134 sends the CONFIRM_CHANGE_TABLE_STATE message to source replication engine 124 which is received at source replication engine 124 at processing step 5 in FIG. 2.

Thereafter, at step 490, target replication engine 134 continues with normal replication activities.

When optimizer module 136 determines in step 450 that specified table 133 is not in table apply status map 138, optimizer module 136 concludes that no operations are currently applied to specified table 133 and at step 455, optimizer module 136 adds specified table 133 to table apply status map 138 and sets the status of specified table 133 in table apply status map 138 to idle. At step 460, target message processing module 135 of target replication engine 134 sends a CONFIRM_CHANGE_TABLE_STATE message to source replication engine 124 which is received at source replication engine 124 at processing step 5 in FIG. 2.

At step 465, target replication engine 134 inserts a control record in the pipeline to idle specified table 133, At step 475, optimizer module 136 continues hatching operations for all other tables in the currently processed UOW thereby discarding all operations for specified table 133. At step 470, apply module 137 receives the control message indicating that the operations for specified table 133 in the replication pipeline are idled and at 480, specified table 133 is removed from table apply status 450 before target replication engine 134 continues to step 490 at which normal replication activities of the replication system are performed.

Steps 465 to 475 and 430 to 440 are performed by target replication engine 134 to "flush" the pipeline of replication operations from operations related to specified table 133. Since it is clear at step 455 that no operations have been applied at this processing stage to specified table 133 that need to be committed, the CONFIRM_CHANGE_TABLE_STATE message can be sent to source replication engine immediately, i.e., before the processing pipeline is "flushed" from operations related to the specified table 133. On the other hand, when it is determined at step 450 that operations had already been applied to specified table 133 before the idling request was received, target replication engine 135 has to wait until steps 430 to 440 are performed, i.e., until the processing pipeline is "flushed" from operations related to the specified table 133, before the CONFIRM_CHANGE_TABLE_STATE message can be sent to source replication engine 124.

An example of table apply status map 138 is shown in FIG. 5. When optimizer batching operations are performed, and optimizer module 136 builds a UOW, it maintains in the UOW a set of the tables that have operations in that UOW. An example of an UOW table set is shown in FIG. 6. A diagrammatic illustration of an example table apply status map 138 as shown in FIG. 5.

When the UOW is submitted to apply module 137 to be applied, the optimizer module iterates through all tables in the UOW. In the example embodiment shown in FIGS. 5 and 6, a user has requested that table 510 (Tab2) and table 515 (Tab3) be idled. Tables 510 and 515 correspond to specified table 133 discussed above. Table 510 (Tab2) and table 515 (Tab3) are added to table apply status map 138 by optimizer module 136 so that table apply status map 138 contains 3 tables. In the example embodiment shown in FIGS. 5 and 6, table 505 (Tab1) was submitted and operations were applied in UOW #27 before the request to idle tables 510 and 515 was received and the application of replication operations were not committed. Accordingly, the idled status of table 505 (Tab1) is set to "false."

Since tables 510 and 515 had to be added to table apply status map 138, this indicates that no replication operations are currently applied to tables 510 and 515, and these tables can immediately be idled by setting the idled status in table apply status map 138 to "true."

UOW table set 600 shown in FIG. 6 includes table 605 (Tab1), table 610 (Tab2) and table 615 (Tab3). When UOW #27 reaches a maximum number of operations, it becomes ready to be applied.

For each table in UOW #27 table set 600, target replication engine 134 determines whether the table is contained in table apply status map 138. If the respective table is contained in table apply status map 138 and if the idle status indicates that the table has been idled, all replication operations on that table are removed from UOW table set 600. If target replication engine 134 determines that a table of UOW #27 table set 600 is not in table apply status map 138, target replication engine 134 adds the table to table apply status map 138 and sets the idle status to "false."

In the example embodiment shown in FIGS. 5 and 6, since Tab2 is contained in both table apply status map 138 and UOW table set 600, operations on Tab2 are discarded and Tab3 is added to table apply status map 138 with idle status "false" (not shown). At this point in time, if the user were to request that Tab1 or Tab3 be idled, the user would have to wait until a commit point and for UOW #27 to finish applying and commit.

It will be appreciated that the embodiments described above and illustrated in the drawings represent only a few of the many ways of implementing embodiments for idling a database object.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, source and target replication engine, source and target message processing module, optimizer module, user interface module, source and target database application, etc.). These systems may include any types of monitors and input devices (e.g., keyboard, mouse, voice recognition, etc.) to enter and/or view information.

It is to be understood that the software (e.g., message processing module, optimizer module and user interface module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., message processing module, optimizer module, user interface module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

Communication network 170 may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data may be implemented by any conventional or other data structures (e.g., files, arrays, lists, stacks, queues, etc.) to store information, and may be stored in any desired storage unit (e.g., database, data or other repositories, etc.).

The present invention embodiments may employ any number of any type of user interface (e.g., Graphical User Interface (GUI), command-line, prompt, etc.) for obtaining or providing information (e.g., notifications, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., notifications, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. I will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for idling a specified database object during database replication comprising:

a computer system including at least one processor configured to:
receive a request from a requestor to idle a specified database object during database replication from a source database to a target database, wherein operations applied to the source database are transferred during optimizer operations as target operations and applied to the target database, the optimizer operations performing actions to optimize the database replication;
monitor target operations for the specified database object on the target database;
when a commit is received:
insert, into a replication pipeline upon receipt of the commit, a first control record, and
insert, into the replication pipeline, a second control record;
force the commit of all of the optimizer operations in response to receiving the first control record from the replication pipeline;
suspend replication of the specified database object in response to receiving the second control record from the replication pipeline; and
notify the requestor when the idling of the specified database object has completed; and
when the specified database object is included in an apply status map, which includes a list of database objects for which target operations are to be applied when the optimizer operations are enabled:
delay the suspending of the replication of the specified database object until the target operations are committed, and
send a confirmation message to the source database indicating that the suspending of the replication of the specified database object was successful.

2. The system of claim 1, wherein the computer system including the at least one processor is further configured to:
when the specified database object is not included in the apply status map:
add the specified database object to the apply status map;
send the confirmation message to the source database indicating that the suspending of the replication of the specified database object was successful, wherein the confirmation message is sent in response to the specified database object being added to the apply status map;
discard all operations, applied to the specified database object of the source database and transferred as the target operations for the specified database object of the target database, while the replication of the specified database object is suspended; and
remove the specified database object from the apply status map.

3. The system of claim 1, wherein the specified database object comprises a table of the target database.

4. The system of claim 1, wherein the target operations for database objects other than the specified database object are continuously performed during the idling of the specified database object.

5. The system of claim 1, wherein the request to idle the specified database object is received from a user interface, and the computer system including the at least one processor is further configured to:
send the confirmation message indicating that the suspending of the replication of the specified database object was successful to the user interface.

6. The system of claim 1, wherein the actions include at least one of reorder the target operations by table to increase batching opportunities, and separate the target operations into sets to be sent to separate apply modules to increase apply concurrency.

7. A computer program product for idling a specified database object during database replication comprising:
a computer readable storage medium having computer readable program code embodied therewith, the computer readable program code comprising computer readable program code configured to:
receive a request from a requestor to idle a specified database object during database replication from a source database to a target database, wherein operations applied to the source database are transferred during optimizer operations as target operations and applied to the target database, the optimizer operations performing actions to optimize the database replication;
monitor target operations for the specified database object on the target database;
when a commit is received:
insert, into a replication pipeline upon receipt of the commit, a first control record, and
insert, into the replication pipeline, a second control record;
force the commit of all of the optimizer operations in response to receiving the first control record from the replication pipeline;
suspend replication of the specified database object in response to receiving the second control record from the replication pipeline; and
notify the requestor when the idling of the specified database object has completed; and
when the specified database object is included in an apply status map, which includes a list of database objects for which target operations are to be applied when the optimizer operations are enabled:
delay the suspending of the replication of the specified database object until the target operations are committed, and
send a confirmation message to the source database indicating that the suspending of the replication of the specified database object was successful.

8. The computer program product of claim 7, wherein the computer readable program code is further configured to:
when the specified database object is not included in the apply status:
add the specified database object to the apply status map;
send the confirmation message to the source database indicating that the suspending of the replication of the specified database object was successful, wherein the confirmation message is sent in response to the specified database object being added to the apply status map;
discard all operations, applied to the specified database object of the source database and transferred as the target operations for the specified database object of the target database, while the replication of the specified database object is suspended; and
remove the specified database object from the apply status map.

9. The computer program product of claim 7, wherein the specified database object comprises a table of the target database.

10. The computer program product of claim 7, wherein the target operations for database objects other than the specified database object are continuously performed during the idling of the specified database object.

11. The computer program product of claim 7, wherein the request to idle the specified database object is received from a user interface, and the computer readable program code is further configured to:

send the confirmation message indicating that the suspending of the replication of the specified database object was successful to the user interface.

12. The computer program product of claim 7, wherein the actions include at least one of reorder the target operations by table to increase batching opportunities, and separate the target operations into sets to be sent to separate apply modules to increase apply concurrency.

* * * * *